(12) United States Patent
Gardner et al.

(10) Patent No.: US 12,017,691 B1
(45) Date of Patent: Jun. 25, 2024

(54) TECHNIQUES FOR PREDICTING RAILROAD TRACK GEOMETRY EXCEEDANCES

(71) Applicant: Bentley Systems, Incorporated, Exton, PA (US)

(72) Inventors: Marc-André Gardner, Quebec City (CA); Marc-André Lapointe, Quebec City (CA); Lucas Flett, Oakville (CA); Simon Savary, Quebec City (CA); Andrew Smith, Pulborough (GB)

(73) Assignee: Bentley Systems, Incorporated, Exton, PA (US)

( * ) Notice: Subject to any disclaimer, the term of this patent is extended or adjusted under 35 U.S.C. 154(b) by 345 days.

(21) Appl. No.: 17/469,523

(22) Filed: Sep. 8, 2021

(51) Int. Cl.
| | |
|---|---|
| *B61L 23/04* | (2006.01) |
| *G06F 18/21* | (2023.01) |
| *G06F 18/214* | (2023.01) |
| *G06N 20/00* | (2019.01) |

(52) U.S. Cl.
CPC .......... *B61L 23/045* (2013.01); *G06F 18/214* (2023.01); *G06N 20/00* (2019.01)

(58) Field of Classification Search
CPC ...... B61L 23/04; B61L 23/044; B61L 23/045; B61L 23/047; B61L 25/02; B61L 25/021; G06K 9/62; G06K 9/6215; G06K 9/5218; G06N 20/00; G06F 18/214; E01B 27/02; E01B 35/00

See application file for complete search history.

(56) References Cited

U.S. PATENT DOCUMENTS

| | | | |
|---|---|---|---|
| 9,187,104 B2 | 11/2015 | Fang et al. | |
| 9,530,123 B1* | 12/2016 | Nave | G16Z 99/00 |
| 9,744,978 B2 | 8/2017 | Bhattacharjya et al. | |
| 2014/0297069 A1* | 10/2014 | Landes | E01B 35/00 |
| | | | 701/19 |

(Continued)

OTHER PUBLICATIONS

Lasisi, Ahmed, et al., "Machine Learning Ensembles and Rail Defects Prediction: Multilayer Stacking Methodology," ASCE, American Society of Civil Engineers, ASCE-ASME Journal of Risk and Uncertainty in Engineering Systems, Part A: Civil Engineering, vol. 5, No. 4, Oct. 15, 2019, pp. 1-17.

(Continued)

*Primary Examiner* — John Kwon
*Assistant Examiner* — Johnny H Hoang
(74) *Attorney, Agent, or Firm* — Cesari and McKenna, LLP; James A. Blanchette

(57) ABSTRACT

In example embodiments, techniques are provided for using machine learning to predict railroad track geometry exceedances to enable proactive maintenance. A machine learning model of a rail operational analytics application may be trained to directly output a probability of future railroad track geometry exceedances for each portion of track of a railroad. Training may be performed using all available railroad track data, and the task of selecting which data is relevant to predicting probability of railroad track geometry exceedances may be devolved to the machine learning model. Further, assumptions about the specific railroad and data characteristics may be avoided, providing the machine learning model flexibility, and allowing for dynamic changes in the problem formulation.

23 Claims, 14 Drawing Sheets

(56) References Cited

U.S. PATENT DOCUMENTS

| | | | |
|---|---|---|---|
| 2015/0057851 A1* | 2/2015 | Turner | E01B 35/00 701/19 |
| 2018/0222504 A1* | 8/2018 | Birch | B61L 3/008 |
| 2020/0207389 A1* | 7/2020 | Moth | B61L 23/048 |
| 2020/0327642 A1* | 10/2020 | Saha | G06T 5/50 |
| 2021/0117716 A1 | 4/2021 | Lapointe et al. | |

OTHER PUBLICATIONS

Lasisi, Ahmed, et al., "Principal Components Analysis and Track Quality Index: A Machine Learning Approach," Elsevier Ltd, Elsevier, ScienceDirect, Transportation Research Part C, vol. 91, Apr. 19, 2018, pp. 230-248.
Li, Huile, et al., "A Machine Learning Based Approach for Efficient Safety Evaluation of the High Speed Train and Short Span Bridge System," lajss.org ©, Latin America Journal of Solids and Structures, vol. 17, No. 7, e319, Sep. 8, 2020, pp. 1-17.
Rosa, A De, et al., "Monitoring of Lateral and Cross Level track Geometry Irregularities Through Onboard Vehicle Dynamics Measurements Using Machine Learning Classification Algorithms," IMechE, Institution of Mechanical Engineers, proc IMechE part F: Journal of Rail and Rapid Transit, vol. 235, No. 1, Jan. 22, 2020, pp. 107-120.
Tsunashima, Hitoshi, "Condition Monitoring of Railway tracks from Car-Body Vibration Using a Machine Learning Technique," MDPI, Applied Sciences, vol. 9, No. 2734, Jul. 5, 2019, pp. 1-13.
Cho, Kyunghyun, et al., "Learning Phase Representation Using RNN Encoder-Decoder for Statistical Machine Translation," arXiv, Sep. 3, 2014, pp. 1-15.
Falamarzi, Amir, et al., "A Review of Rail Track Degradation Prediction Models," Engineers Australia, Taylor & Francis Group, Australian Journal of Civil Engineering, Sep. 17, 2019, pp. 1-16.
Gilbert, Xavier, et al., "Deep Multi-task Learning for Railway Track Inspection," arXiv, Sep. 17, 2015, pp. 1-12.
Kite, David, et al., "Detecting Embankment Instability Using Measurable Track Geometry Data," MDPI, Infrastructures, Mar. 12, 2020, pp. 1-18.
Lasisi, Ahmed, et al., "Principal Components Analysis and Track Quality Index: A Machine Learning Approach," Elsevier Ltd., ScienceDirect, Transportation Research Part C, vol. 91, Apr. 2018, pp. 230-248.
Ma, Shuai, et al., "Deep Learning for Track Quality Evaluation of High-Speed Railway Based on Vehicle-Body Vibration Prediction," IEEE, IEEE Access, Dec. 2019, pp. 1-10.
Mohammadi, Reza et al., "Exploring the Impact of Foot-by-Foot Track Geometry on the Occurrence of Rail Defects," Elsevier Ltd., ScienceDirect, Transportation Research Part C, vol. 102, Mar. 2019, pp. 153-172.
Nakhaee, Muhammad, et al., "The Recent Applications of Machine Learning in Rail Track Maintenance: A Survey," Reliability, Safety, and Security of Railway Systems. Modelling, Analysis, Verification, and Certification, Jan. 2019, pp. 1-15.
Oyama, Tatsuo, et al., "Mathematical Modeling Analyses for Obtaining an Optimal Railway Track Maintenance Schedule," Japan Journal of Industrial and Applied Mathematics, vol. 23, No. 2, Jun. 2006, pp. 207-224.
Smith, Andrew, "Optram Analysis and Forecasting," Bentley Systems, Incorporated, A Bentley White Paper, Bentley, Jan. 2016, pp. 1-20.
Soleimanmeigouni, Iman, et al., "Investigation of the Effect of the Inspection Intervals on the Track Geometry Condition," Taylor & Francis Group, Structure and Infrastructure Engineering: Maintenance, Management. Life-Cycle Design and Performance, Nov. 20, 2019, pp. 1-10.
U.S. Appl. No. 17/075,412, filed Oct. 20, 2020 by Karl-Alexandre Jahjah et al. for Automatic Identification of Misclassified Elements of an Infrastructure Model, pp. 1-46.
U.S. Appl. No. 17/128,912, filed Dec. 21, 2020 by Karl-Alexandre Jahjah et al. for Techniques for Labeling, Reviewing and Correcting Label Predictions for P&IDS, pp. 1-44.
U.S. Appl. No. 17/129,205, filed Dec. 21, 2020 by Marc-André Gardner et al. for Techniques for Extracting Machine-Readable Information From P&IDS, pp. 1-29.
U.S. Appl. No. 17/314,735, filed May 7, 2021 by Louis-Philippe Asselin et al. for Classifying Elements and Predicting Properties in an Infrastructure Model Through Prototype Networks and Weakly Supervised Learning, pp. 1-40.

* cited by examiner

400

| EXCEPTION | CTS | Level 1 Exceptions | | | | |
|---|---|---|---|---|---|---|
| | | CLASS1 | CLASS2 | CLASS3 | CLASS4 | CLASS5 |
| L Prof 62 | TSC | 3 | 2.75 | 2.25 | 2 | 1.25 |
| R Prof 62 | TSC | 3 | 2.75 | 2.25 | 2 | 1.25 |
| L Runoff | TSC | 3.5 | 3 | 2 | 1.5 | 1 |
| R Runoff | TSC | 3.5 | 3 | 2 | 1.5 | 1 |
| L Algn 31 | SC | -- | -- | 1.25 | 1 | 0.5 |
| R Algn 31 | SC | -- | -- | 1.25 | 1 | 0.5 |
| L Algn 62 | T | 5 | 3 | 1.75 | 1.5 | 0.75 |
| R Algn 62 | T | 5 | 3 | 1.75 | 1.5 | 0.75 |
| L Algn 62 | SC | 5 | 3 | 1.75 | 1.5 | 0.625 |
| R Algn 62 | SC | 5 | 3 | 1.75 | 1.5 | 0.625 |
| Gage Wide | TSC | 58 | 57.75 | 57.75 | 57.5 | 57.5 |
| Gage Tight | TSC | 55.9 | 55.9 | 55.9 | 55.9 | 55.9 |
| Crosslevel | T | 3 | 2 | 1.75 | 1.25 | 1 |
| Reverse Elevation | SC | 3 | 2 | 1.75 | 1.25 | 1 |
| Excess Elevation | SC | 8 | 8 | 7 | 7 | 7 |
| Rockoff Hazard | TSC | 9 | 1.25 | 1.25 | 1.25 | 1.25 |
| Warp 62 | TSC | 3 | 2.25 | 2 | 1.75 | 1.5 |
| Warp > 6 | C | 1.5 | 1.5 | 1.5 | 1.5 | 1.5 |
| Twist 31 | S | -- | -- | -- | -- | -- |
| Limit Speed 4 | C | -- | -- | -- | -- | -- |

| EXCEPTION | CTS | Level 2 Exceptions | | | | |
|---|---|---|---|---|---|---|
| | | CLASS1 | CLASS2 | CLASS3 | CLASS4 | CLASS5 |
| L Prof 62 | TSC | 2.75 | 2.25 | 2 | 1.25 | 1 |
| R Prof 62 | TSC | 2.75 | 2.25 | 2 | 1.25 | 1 |
| L Runoff | TSC | 2.75 | 2 | 1.5 | 1 | 0.75 |
| R Runoff | TSC | 2.75 | 2 | 1.5 | 1 | 0.75 |
| L Algn 31 | SC | -- | -- | 1 | 0.5 | 0.375 |
| R Algn 31 | SC | -- | -- | 1 | 0.5 | 0.375 |
| L Algn 62 | T | 3 | 1.75 | 1.5 | 0.75 | 0.625 |
| R Algn 62 | T | 3 | 1.75 | 1.5 | 0.75 | 0.625 |
| L Algn 62 | SC | 3 | 1.75 | 1.5 | 0.625 | 0.5 |
| R Algn 62 | SC | 3 | 1.75 | 1.5 | 0.625 | 0.5 |
| Gage Wide | TSC | 57.25 | 57.25 | 57.25 | 57.25 | 57 |
| Gage Tight | TSC | 56 | 56 | 56 | 56 | 56 |
| Crosslevel | T | 2 | 1.5 | 1.25 | 1 | 0.75 |
| Reverse Elevation | SC | 2 | 1.5 | 1.25 | 1 | 0.75 |
| Excess Elevation | SC | 6.75 | 6.75 | 6 | 6 | 6 |
| Rockoff Hazard | TSC | 1.25 | 1 | 1 | 1 | 1 |
| Warp 62 | TSC | 2.25 | 2 | 1.75 | 1.5 | 1.25 |
| Warp > 6 | C | 1.25 | 1.25 | 1.25 | 1.25 | 1 |
| Twist 31 | S | 2 | 1.75 | 1.25 | 1 | 1 |
| Limit Speed 3 | C | -- | -- | -- | -- | 0.75 |

FIG. 4B

TECHNIQUES FOR PREDICTING RAILROAD TRACK GEOMETRY EXCEEDANCES

BACKGROUND

Technical Field

The present disclosure relates generally to proactive maintenance of railroad tracks and more specifically to predicting when railroad track geometry will exceed safety and/or maintenance thresholds to enable proactive maintenance.

Background Information

Railroad operators typically survey railroad track geometry on a regular basis. The geometry measurements from the survey are compared to safety and/or maintenance thresholds to determine if track geometry for any portions of track exceed the thresholds (referred to herein as "railroad track geometry exceedances"). Exceeding a safety threshold indicates that the portion of track may be unsafe for operation at normal operation speeds or loads. The railroad operator is typically required to slow trains (i.e., issue a slow order) over the portion of track until track maintenance is performed (e.g., the portion of track is repaired or replaced). Slow orders typically impact railroad operator revenue by deceasing on-time performance and reducing customer satisfaction, and therefore should be avoided. Exceeding a maintenance threshold indicates that the portion of track is near to a safety limit. While the railroad operator may not yet be required to slow trains over the portion of track, it is a warning that the track has degraded and may soon further degrade to the point that a safety threshold is exceeded and trains must be slowed, unless track maintenance is performed.

Current practices for detecting railroad track geometry exceedances and performing track maintenance in response thereto suffer a number of shortcomings. First, such practices are largely reactive, not proactive. Railroad operators respond to the occurrence of railroad track geometry exceedances; they have little ability to predict when and where railroad track geometry exceedances will occur in the future. Second, such practices typically only rely on the most recent survey (not all available railroad track data) limiting the types of information they can provide, including information about which exceedances should be addressed first. For example, a railroad track geometry survey may indicate so many exceedances of maintenance thresholds it may be impractical to address them all in a timely manner. Some portions of track identified as exceeding maintenance thresholds may be stable (i.e., not further degrading at a significant rate) while other portions of track may be rapidly degrading (i.e., such that a safety threshold is likely to be exceeded soon). However, current practices typically cannot discriminate between the two cases.

Accordingly, there is a need for improved techniques that may predict railroad track geometry exceedances to enable proactive maintenance.

SUMMARY

In various embodiments, techniques are provided for using machine learning to predict railroad track geometry exceedances to enable proactive maintenance. A machine learning model of a rail operational analytics application may be trained to directly output a probability of future railroad track geometry exceedances for each portion of track of a railroad (e.g., as opposed to a quality index or other surrogate for railroad health). Training may be performed using all available railroad track data, and the task of selecting which data is relevant to predicting probability of future railroad track geometry exceedances may be devolved to the machine learning model. Further, assumptions about the specific railroad and data characteristics (e.g., track length, number and type of survey measurements, number of surveys, time windows for surveys, etc.) may be avoided, providing the machine learning model flexibility, and allowing for dynamic changes in the problem formulation.

In one embodiment, a rail operational analytics application uses machine learning to predict railroad track geometry exceedances to enable proactive maintenance. The application obtains railroad track data including a plurality of railroad track geometry surveys that each include geometry measurements of the railroad track at a corresponding time. The application processes the railroad track data to remove outliers and/or correct alignment errors in the geometry measurements. A trained machine learning model of the application then predicts a probability of railroad track geometry exceedances for a future time step for each portion of track based on the processed railroad track data. To do so, a network input is created, latent spatial features are extracted from the network input, time relationships are extracted from the latent spatial features to produce latent time-invariant features, and the latent time-invariant features are decoded to produce predictions that include a probability of railroad track geometry exceedances for the future time step. The application displays an indication of the probability of future railroad track geometry exceedances in a user interface.

It should be understood that a variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description refers to the accompanying drawings of example embodiments, of which:

FIGS. 4A-4B are diagrams illustrating example supplemental safety and maintenance thresholds that may be obtained;

DETAILED DESCRIPTION

Figure 1:
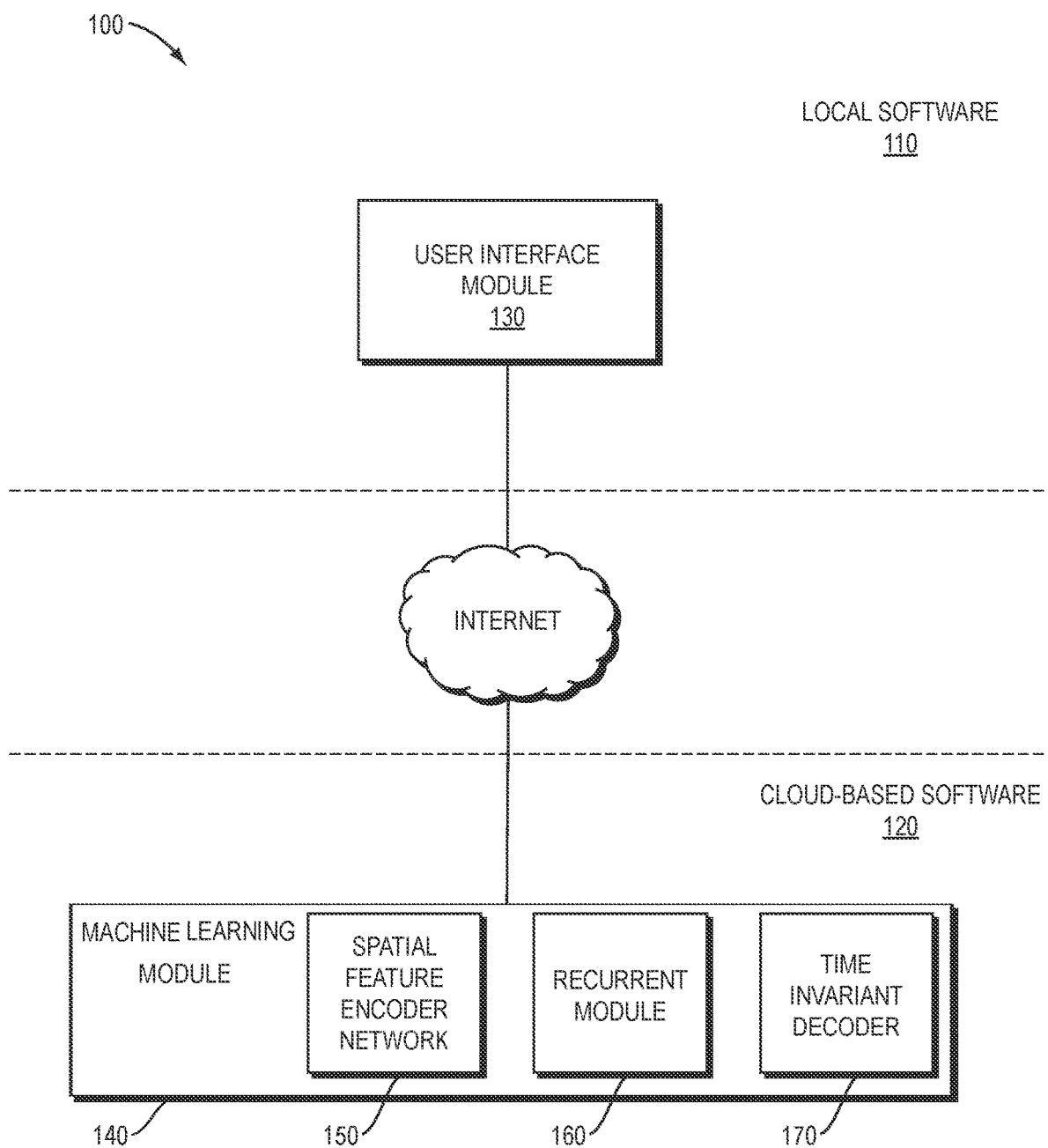
FIG. 1 is a high-level block diagram of an example rail operational analytics application that uses machine learning to predict railroad track geometry exceedances to enable proactive maintenance.

FIG. 1 is a high-level block diagram of an example rail operational analytics application that uses machine learning to predict railroad track geometry exceedances to enable proactive maintenance. The rail operational analytics application 100 may be a stand-alone software application or a component of a larger software application. In one example implementation, the rail operational analytics application 100 is the AssetWise® Operational Analytics application, available from Bentley Systems of Exton, PA, which includes functionality for proactive management and decision support for rail assets. However, it should be understood that the rail operational analytics application 100 may take a variety of other forms.

The rail operational analytics application 100 may be divided into local software 110 that executes on one or more computing devices local to an end-user (collectively "local devices") and, in some cases, cloud-based software 120 that is executed on one or more computing devices remote from the end-user (collectively "cloud computing devices") accessible via a network (e.g., the Internet). Each computing device may include processors, memory/storage, a display screen, and other hardware (not shown) for executing software, storing data and/or displaying information. The local software 110 may include a number of software modules operating on a local device and the cloud-based software 120, if present, may include, in additional software modules operating on cloud computing devices. Tasks may be divided in a variety of different manners among the software modules. For example, in one implementation, software modules 120 of the local software 110 may be responsible for performing non-processing intensive operations such as providing user interface functionality. To such end, the software modules of the local software 110 may include a user interface module 130, as well as other software modules (not shown). The software modules of the cloud-based software 120 may perform more processing intensive operations, such as operations related to machine learning. To such end, the software modules of the cloud-based software 120 may include a machine learning module 140 that trains and makes predictions using a machine learning model, as well as other software modules (not shown). In one implementation, the machine learning module 140 utilizes a deep neural network that includes a spatial feature encoder network 150 based on one or more convolution layers, a recurrent module 160 based on one or more gated recurrent units (GRUs) and a time-invariant decoder 170 (e.g., based on one or more fully-connected layers, convolutional layers, etc.). However, it should be understood that the machine learning module 140 may alternatively take a variety of different forms which may utilize other types of networks and layers.

Figure 2A:
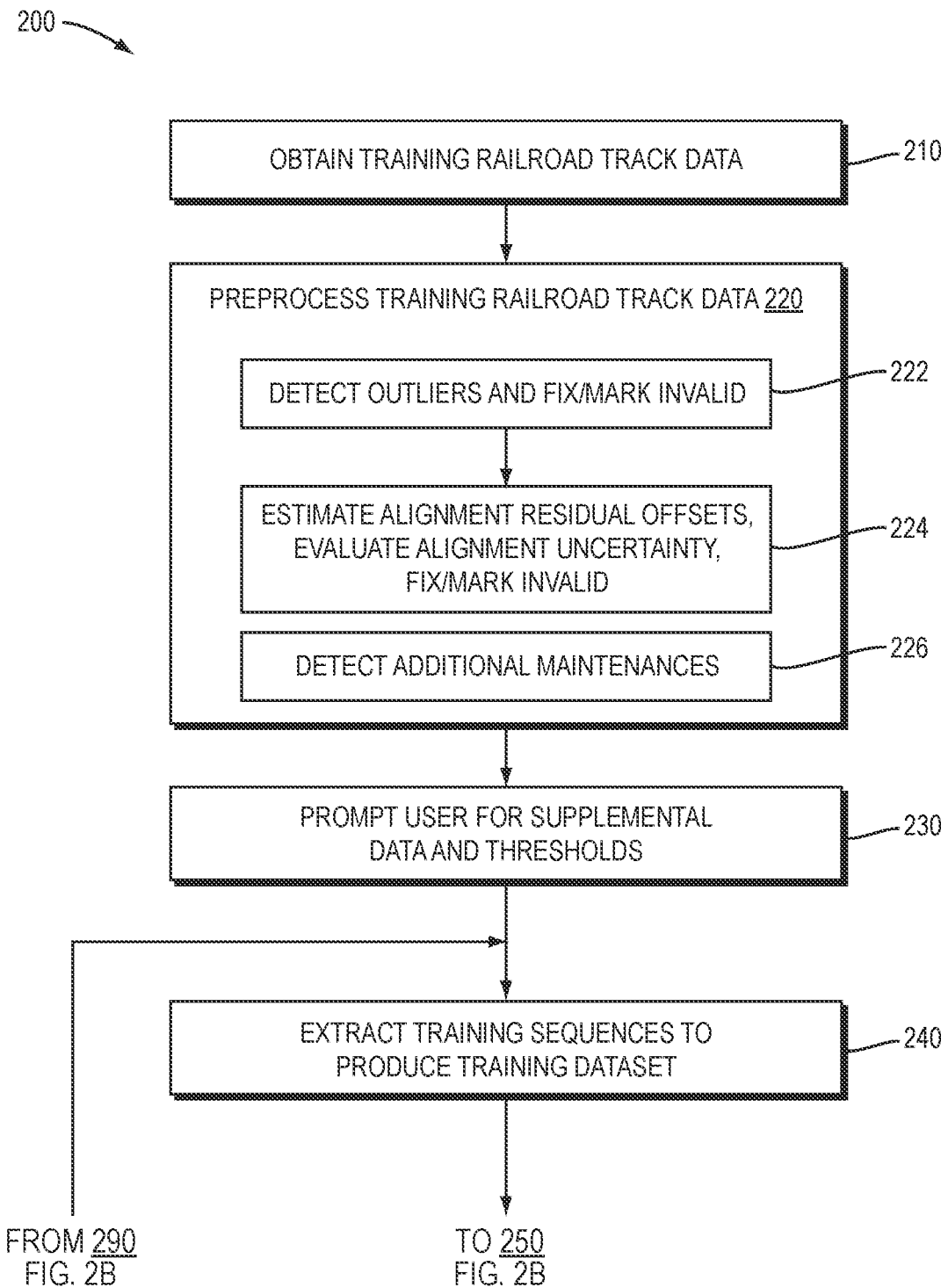
FIGS. 2A-2B are a flow diagram of an example sequence of steps that may be executed by the rail operational analytics application in a training mode to train the machine learning model.
Figure 2B:
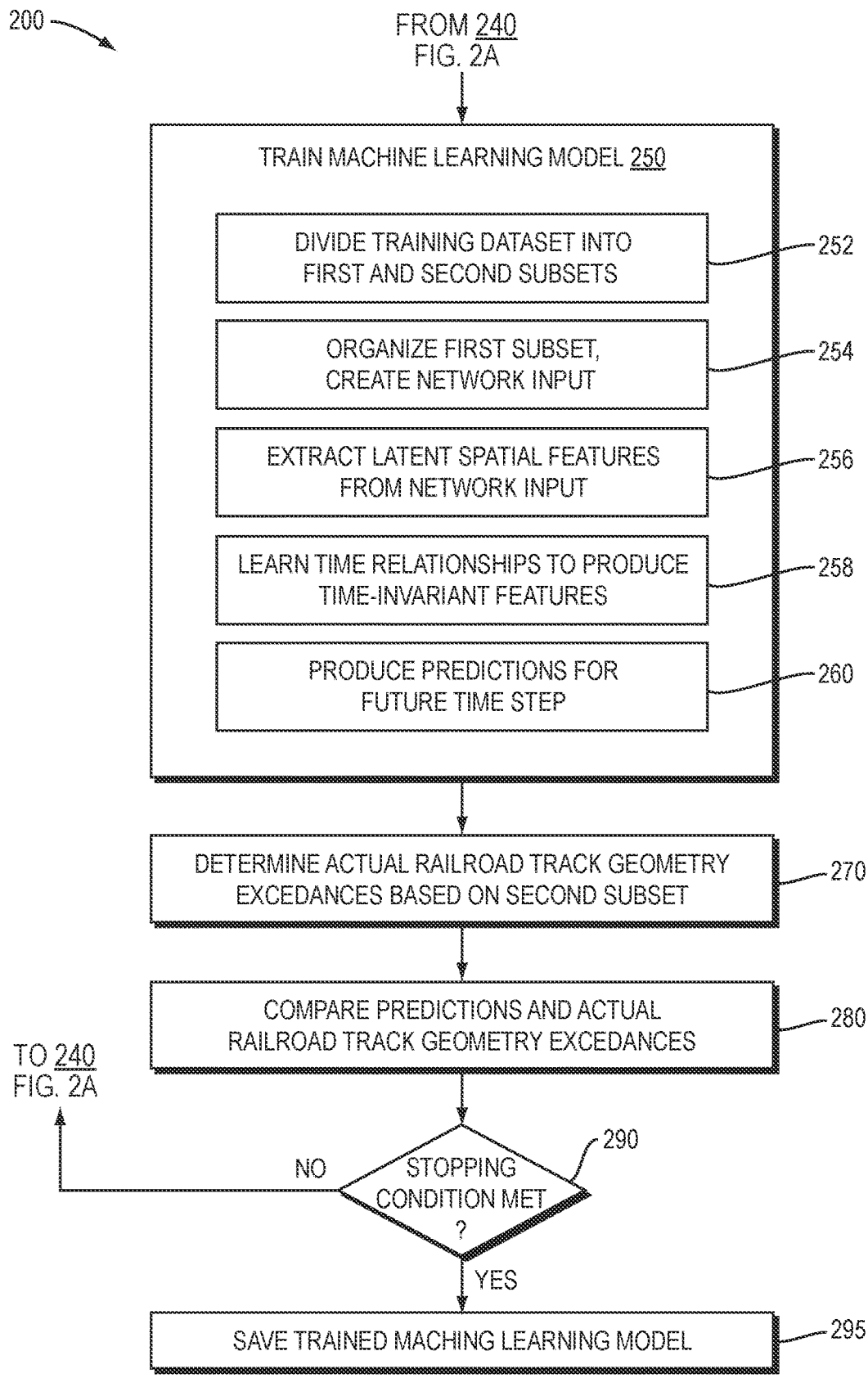

Before the rail operational analytics application 100 can use the machine learning model to predict railroad track geometry exceedances, the machine learning model must be trained. FIGS. 2A-2B are a flow diagram of an example sequence of steps 200 that may be executed by the rail operational analytics application 100 in a training mode to train the machine learning model. At step 210, the rail operational analytics application 100 obtains (e.g., accesses from memory/storage) training railroad track data. The training railroad track data includes training railroad track geometry surveys that each include geometry measurements for the railroad track at a corresponding time. The geometry measurements may be captured at regular intervals (e.g., every meter (m), every 30 centimeters (cm), etc.) by instruments mounted to a train traveling the railroad track, and are preferably overlapping (i.e., to provide a history of change over time). The geometry measurements may include individual information such as the gauge (an indicator of the distance between the rails), left-right versine (an indicator of how "straight" the track is), left-right profile (an indicator of how "bumpy" the track is), crosslevel (an indicator of the difference in elevation between each rail of the track), twist (an indicator of difference in crosslevel between two points a fixed distance apart on the track), position (an indicator of location along the length of the track), train speed (an indicator of the speed of the measurement device at the time of capture), as well as, or alternatively, other types of information. The training railroad track data may also include maintenance logs that each include information about any maintenances performed on the railroad track. The maintenance logs may include individual quantities for each maintenance, such as time (date) of the maintenance, type of the maintenance, position of the maintenance (an indicator of location along the length of the track), as well as, or alternatively, other types of information.

At step 220, the rail operational analytics application 100 preprocesses the training railroad track data. The preprocessing may include a number of sub-steps. At sub-step 222, an outlier detection and removal algorithm detects and attempts to fix outliers in the training railroad track geometry surveys. The outliers may be fixed by correcting geometry measurements for each portion of a railroad track geometry survey that is an outlier. If correction is not possible, the outlier detection and removal algorithm marks the portion as invalid (e.g., using a valid/invalid binary mask). The valid/invalid binary mask may be a mask that includes a flag (e.g., 0 or 1) that indicates whether each portion of track is valid and should be considered, or is invalid and should not be considered. Details of an example outlier detection and removal algorithm that may be employed are discussed below in connection with FIG. 11. At sub-step 224, an alignment evaluation and correction algorithm estimates alignment residual offsets, evaluates alignment uncertainty and attempts to correct each portion of track that is misaligned in the training railroad track geometry surveys. Misalignments may be corrected by resampling and realignment. If correction is not possible, the alignment evaluation and correction algorithm marks the portion as invalid (e.g., using the valid/invalid binary mask). Details of an example outlier alignment algorithm that may be employed are discussed below in connection with FIGS. 7A-7B. At sub-step 226, an automatic maintenance detection algorithm attempts to detect any additional maintenances (e.g., beyond those indicated in the maintenance logs) that may have significantly changed rail dynamics.

Figure 3:
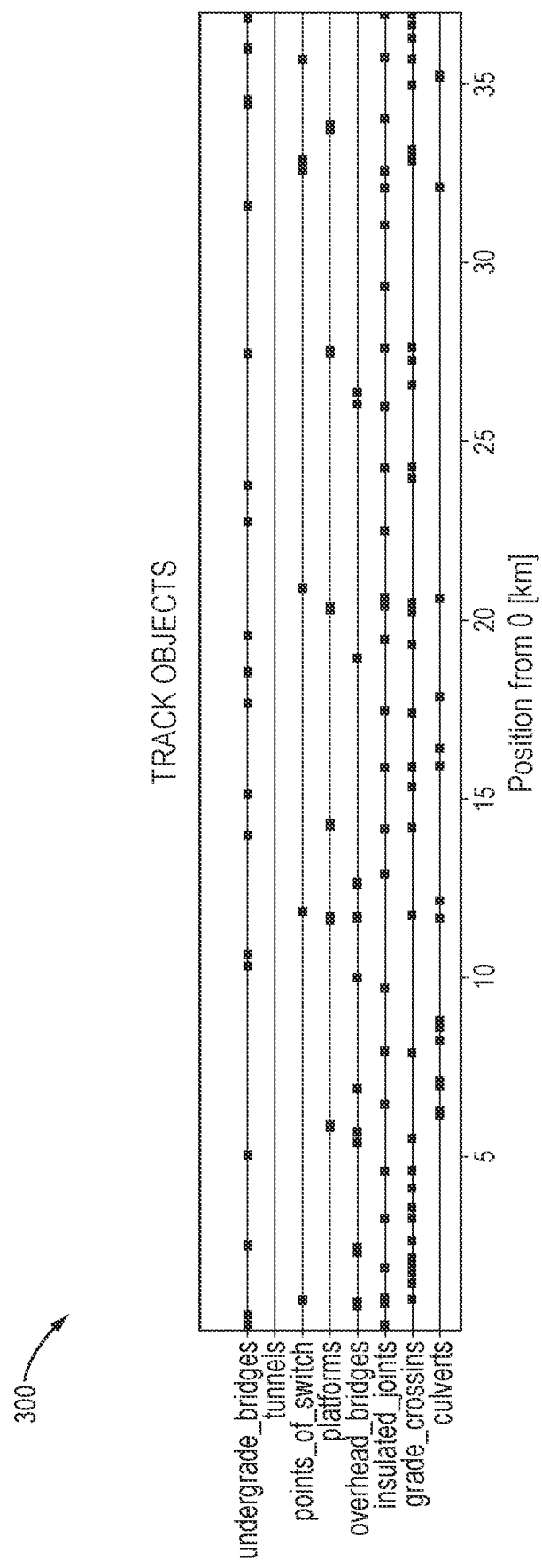
FIG. 3 is a diagram illustrating example supplemental data describing track objects.

At step 230, the rail operational analytics application obtains (e.g., accesses from memory/storage, prompts the user to enter in a user interface, etc.) supplemental data and thresholds. The supplemental data may include information describing any railroad track objects (e.g., position of any bridges, tunnels, switches, platforms, etc.), information describing traffic on the railroad track between surveys (e.g., number of passengers, tons of freight transported, etc.), information describing weather conditions, as well as, or alternatively, other types of information. FIG. 3 is a diagram 300 illustrating example supplemental data describing track objects that may be obtained as part of step 230. The dots on the horizonal lines represent positions of the relevant track objects along the length of the railroad track.

The thresholds may include safety and/or maintenance thresholds that when exceeded define a railroad track geometry exceedance. Often maintenance thresholds are user-specified, while safety thresholds are predefined to comply with regulatory agency or other governmental requirements. FIGS. 4A-4B are diagrams 400, 410 illustrating example supplemental safety and maintenance thresholds that may be obtained as part of step 230. The thresholds are organized into two levels (level 1 and level 2), one for maintenance and one for safety.

At step 240, the rail operational analytics application takes the preprocessed training railroad track data (including the training railroad track geometry surveys, maintenance logs and invalid markings (e.g., valid/invalid binary mask)) and supplemental data, and extracts training sequences to produce a training dataset. Training sequences may be valid segments from railroad track geometry surveys selected so that they do not cross a maintenance that may have significantly changed rail dynamics. In some cases, training sequences may be selected to satisfy a minimum length requirement (e.g., where length is measured in terms of time).

Figure 5:
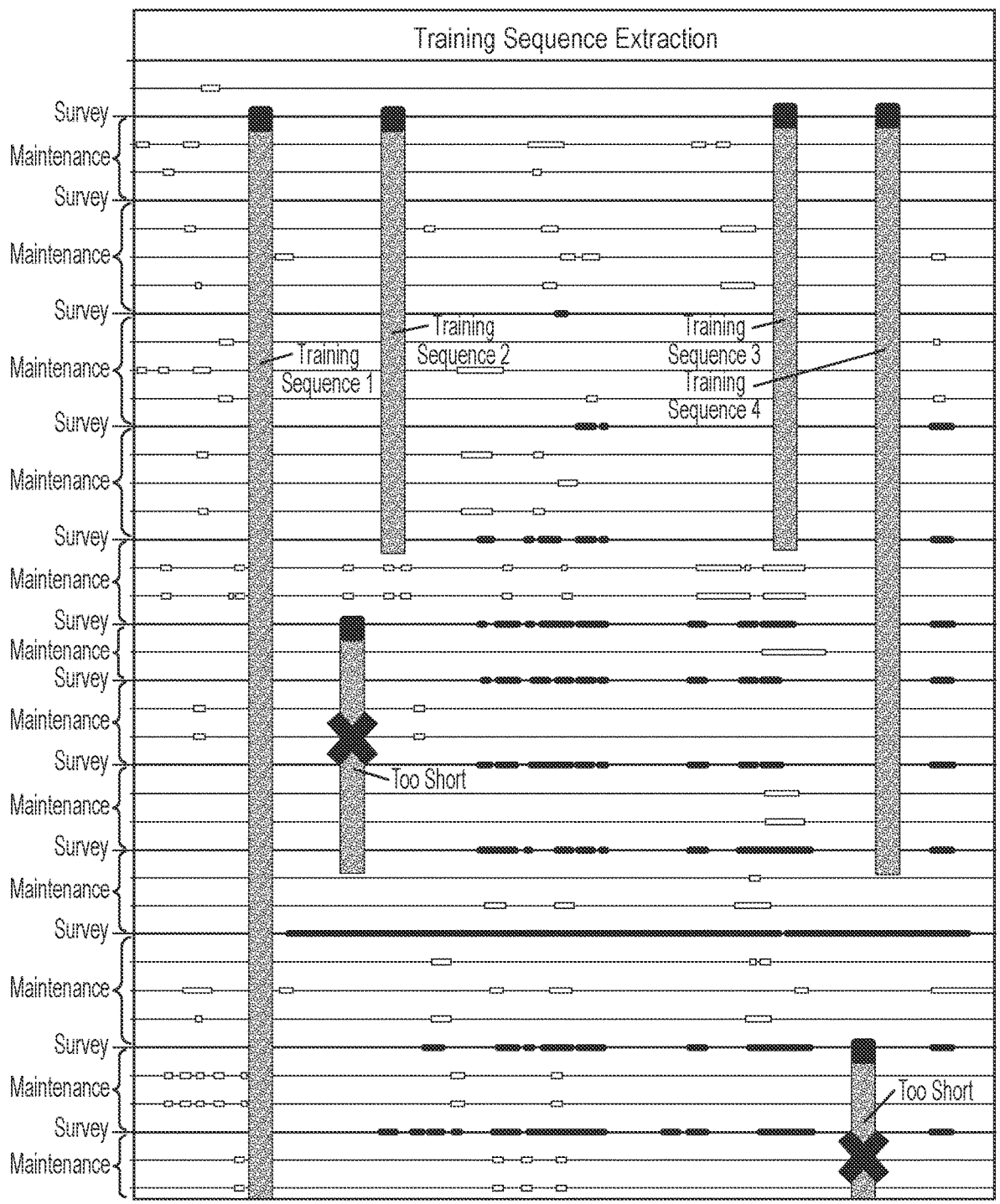
FIG. 5 is a diagram illustrating an example selection of training sequences.

FIG. 5 is a diagram illustrating an example selection of training sequences that may occur as part of step 240 of FIGS. 2A-2B. In this example, railroad track geometry surveys and maintenance logs over time are shown on the vertical axis and length along the railroad track is shown on the horizonal axis. Black dots on the railroad track geometry surveys represent invalid portions, and white dots on the maintenance logs represent maintenances. Vertical bars extending over time while avoiding the dots represent training sequences. Potential training sequences that fail to meet the minimum length requirement are shown with an X superimposed.

At step 250, the rail operational analytics application trains the machine learning model using the training dataset and thresholds. The training may include a number of sub-steps. At sub-step 252, the rail operational analytics application divides the training dataset into a first subset for use as input to the machine learning model and a second subset for use in evaluating the machine learning model's performance. In one implementation, the first subset may include all the railroad track geometry surveys except the most recent railroad track geometry survey, and the second subset may include just the most recent railroad track geometry survey.

Figure 6:
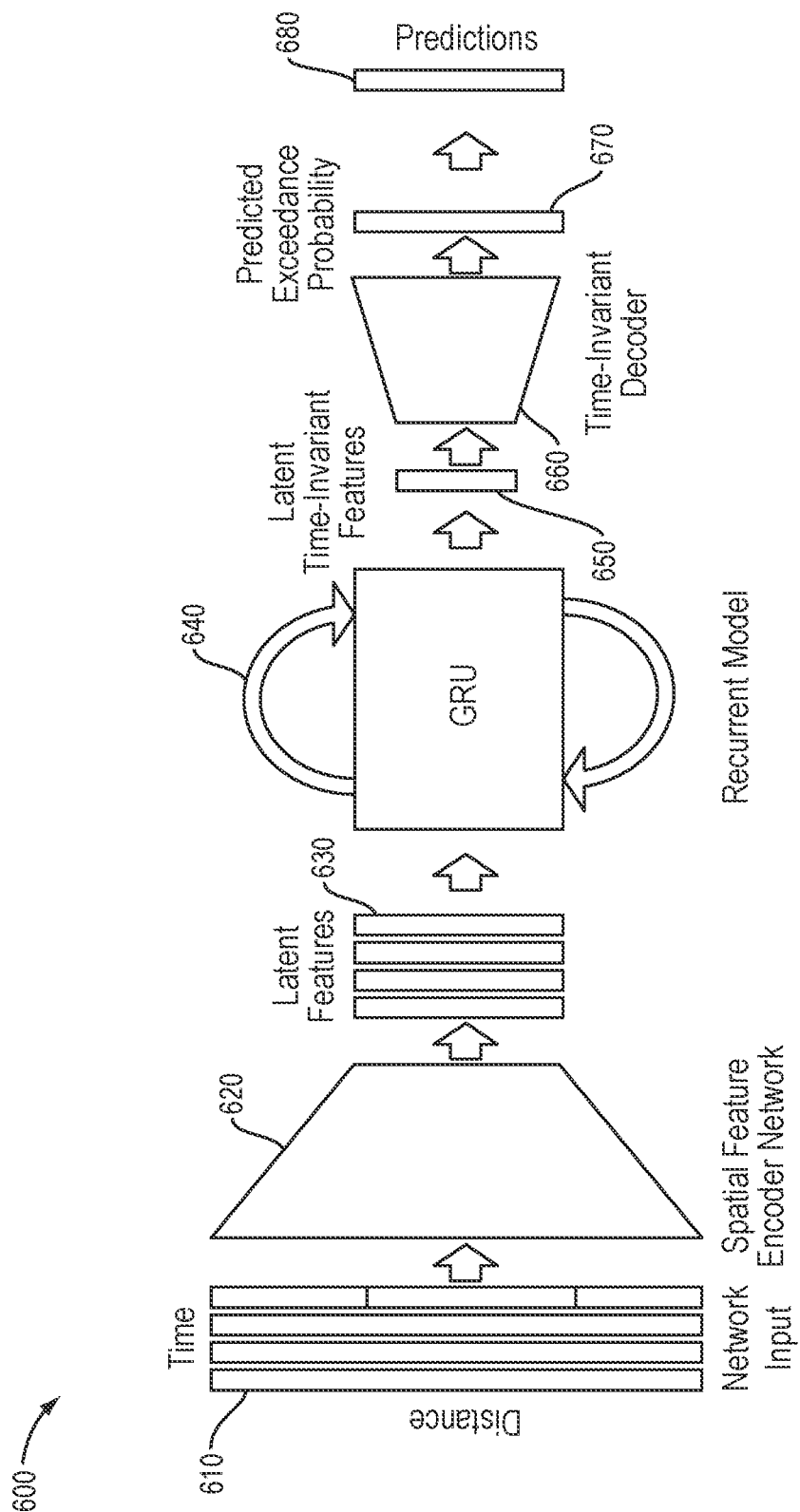
FIG. 6 is a diagram of an example machine learning model, specifically a deep neural network model.

Sub-steps 254-260 of FIGS. 2A-2B may be better understood by referring in parallel also with FIG. 6, which is a diagram of an example machine learning model, specifically a deep neural network model 600, that may be used with the present techniques.

At sub-step 254, the rail operational analytics application organizes the first subset and creates a network input 610 therefrom. The network input may be tensor organized according to three axes: a time axis, a spatial distance axis and a feature axis. The time axis is related to the corresponding time of each geometry measurement (i.e., when each railroad track geometry survey was performed). Depending on the implementation, the number of different times may vary and the interval between each time may or may not be constant. The spatial distance axis is related to position along the railroad track of each geometry measurement. Usually, geometry measurements are captured at regular intervals (e.g., every meter (m), every 30 centimeters (cm), etc.). The feature axis is related to a number of types of geometry measurements available. The machine learning model may support network input with variable lengths for the time and spatial distance axes at runtime. For the feature axis, the machine learning model may support variable lengths with retraining.

At sub-step 256, a spatial feature encoder network 620 of the deep neural network 600 extracts latent spatial features 630 from the network input 610. The spatial feature encoder network 620 may be based on convolution layers that takes the geometry measurements of each railroad track geometry survey independently as input and applies dynamically learned filters to reduce dimensionality and extract relevant information. That is, the spatial feature encoder network 620 learns to extract important information from a single railroad track geometry survey independent of time.

At sub-step 258, a recurrent module 640 of the deep neural network 600 extracts time relationships of the extracted latent spatial features 630 to produce latent time-invariant features 650. The recurrent module 640 may be based on one or more gated recurrent units (GRUs) that learn relationships appearing through time. Because the learning is based on information that has already been processed to extract important spatial information, the latent time-invariant features 650 are both time and spatial aware.

At sub-step 260, a time-invariant decoder 660 of the deep neural network 600 produces predictions for a future time step of the probability of railroad track geometry exceedances 670 for each portion of track based on the latent time-invariant features 650 and the thresholds from step 230.

A step 270, the rail operational analytics application determines actual railroad track geometry exceedances in portions of track based on the geometry measurements of the second subset (e.g., in the most recent railroad track geometry survey). The actual railroad track geometry exceedances may be determined by comparing the geometry measurements of the second subset (e.g., in the most recent railroad track geometry survey) to the thresholds from step 230.

Figure 7A:
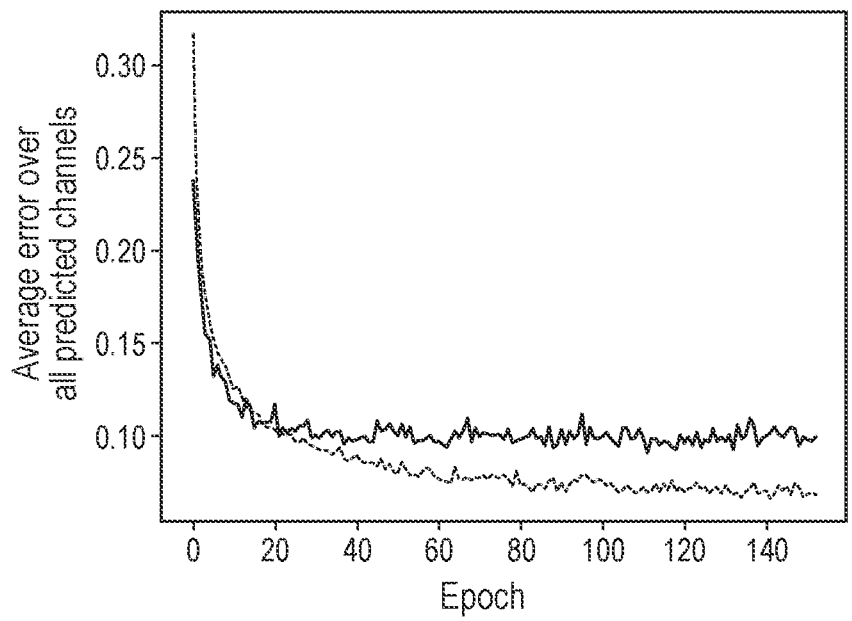
FIGS. 7A-7B are a set of curves from a loss function and performance metric that may be used to guide learning and determine training completion.
Figure 7B:
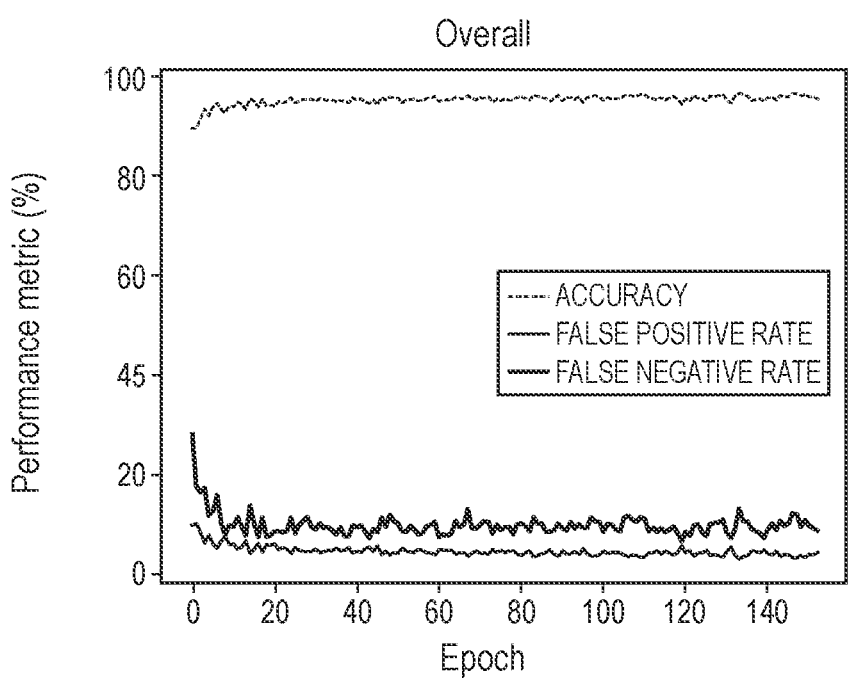

A step 280, the rail operational analytics application compares the predictions 470 of the probability of railroad track geometry exceedances for each portion of track determined in sub-step 260 against the actual railroad track geometry exceedances for each portion of track determined in sub-step 262 to evaluate the machine learning model's performance. Learning may be guided by a loss function based on such comparison. The loss function that may be tuned to increase recall (i.e., minimize the number of missed exceedances), increase precision (i.e., minimize the number of false positives or negatives among the predictions), and/or achieve some other benefit or combination of benefits. Training completion may also be determined based on the comparison. An error metric may be calculated that measures accuracy, precision and/or some other quantity or combination of quantities. FIGS. 7A-7B are a set of curves from a loss function and performance metric that may be used to guide learning and determine training completion.

At step 290, the rail operational analytics application determines if the error metric meets a threshold or if another stopping condition has been met (e.g., a maximum number of training iterations have been reached). If so, execution proceeds to step 295, where the rail operational analytics application saves the trained machine learning model. If not, execution loops back to step 240, where additional training is performed. It should be understood that upon such loop new sequences may extracted and a new training dataset created, or the existing training dataset may be reused one or more additional times (as the machine learning model may be better able to learn upon being exposed to the data multiple times). Accordingly, in loops that use the same training dataset, step 240 and some portions of step 250 may be skipped as they have already been performed for that training dataset. By repeatedly looping, the machine learning model is iteratively refined until the performance is acceptable or another stopping condition is met.

Figure 8A:
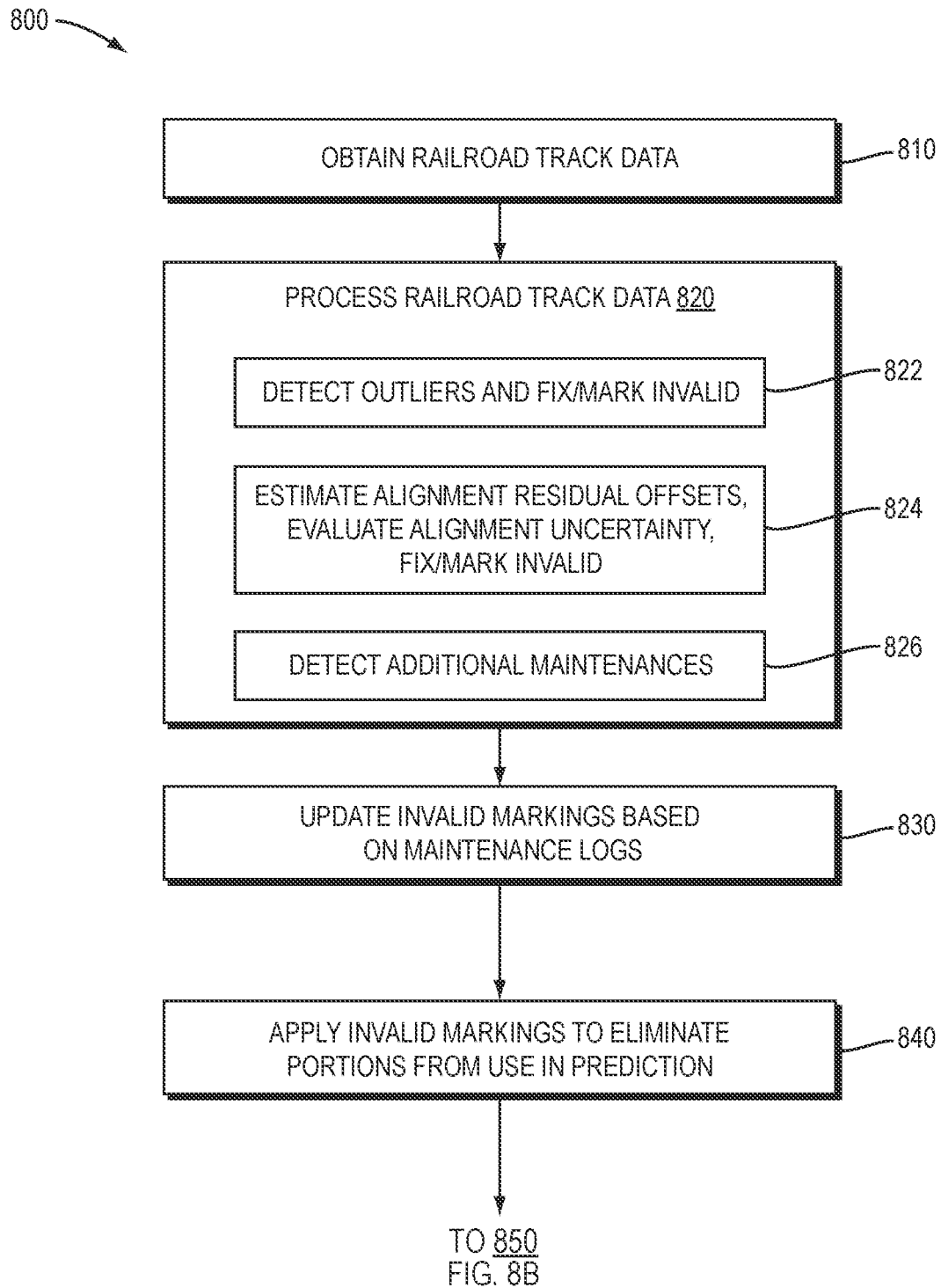
FIGS. 8A-8B are a flow diagram of an example sequence of steps that may be executed by the rail operational analytics application in an inference mode to predict railroad track geometry exceedances.
Figure 8B:
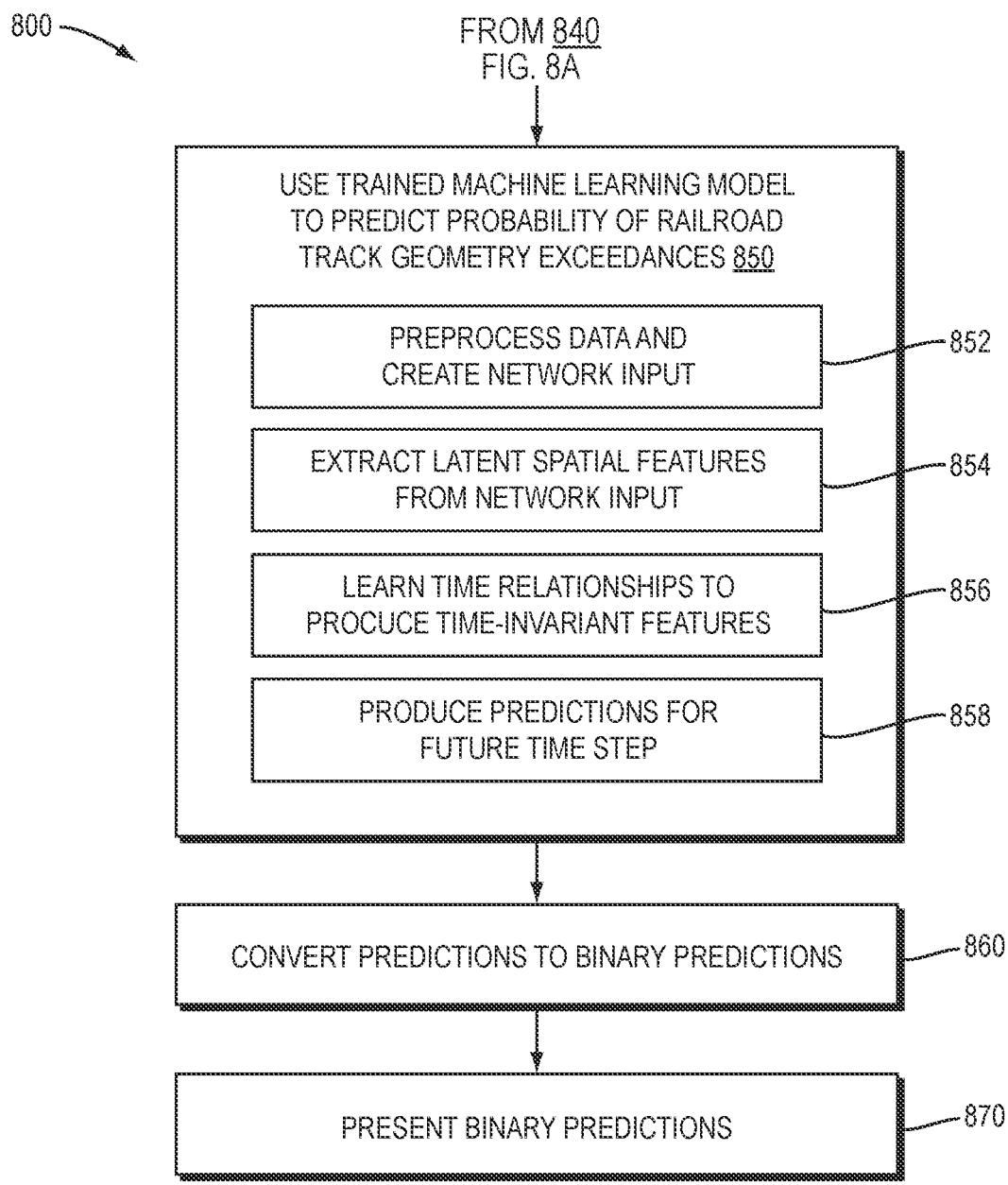

After the machine learning model is trained it may be used to predict railroad track geometry exceedances to enable proactive maintenance of railroad track. FIGS. 8A-8B are a flow diagram of an example sequence of steps 800 that may be executed by the rail operational analytics application 100 in an inference mode to predict railroad track geometry exceedances. Many of the steps 800 of FIGS. 8A-8B are similar to the step 200 of FIGS. 2A-2B, and absent explicit statement to the contrary it should be assumed that the details above for training are also applicable to inference. At step 810, the rail operational analytics application 100 obtains (e.g., accesses from memory/storage) railroad track data. The railroad track data includes railroad track geometry surveys that each includes geometry measurements of the railroad track at a corresponding time. The training railroad track data may also include maintenance logs that each include information about any maintenances performed on the railroad track. As part of step 810, the rail operational analytics application may also obtain (e.g., access from memory/storage, prompt the user to enter in a user interface, etc.) supplemental data and thresholds. The thresholds may include a user defined probability threshold used to determine whether a probability of railroad track geometry exceedance is sufficient to be of interest.

At step 820, the rail operational analytics application 100 processes the railroad track data (including the railroad track geometry surveys and maintenance logs) and the supplemental data. At sub-step 822, the outlier detection and removal algorithm detects and attempts to fix outliers in the railroad track geometry surveys and marks unfixable portions invalid (e.g., using a valid/invalid binary mask), similar to in training. At sub-step 824, the alignment evaluation and correction algorithm estimates alignment residual offsets, evaluates alignment uncertainty and attempts to correct each portion of track that is misaligned in the railroad track geometry surveys, or marks the portion as invalid (e.g., using the valid/invalid binary mask), similar to in training. At sub-step 826, the automatic maintenance detection algorithm attempts to detect any additional maintenances (e.g., beyond those indicated in the maintenance logs) that may have significantly changed rail dynamics.

At step 830, the rail operational analytics application updates the invalid markings (e.g., valid/invalid binary mask) based on the maintenance logs to mark as invalid segments that cross a maintenance which may have significantly changed rail dynamics.

At step 840, the rail operational analytics application takes the processed railroad track data and applies the invalid markings (e.g., valid/invalid binary mask) to the railroad track geometry surveys and eliminates those portions marked as invalid from use in prediction. The remaining railroad track data is what is used.

At step 850, the rail operational analytics application takes the remaining processed railroad track data, and the supplemental information and thresholds, and applies them to the trained machine learning model to predict probability of future railroad track geometry exceedances for each portion of track. The prediction may involve a number of sub-steps. At sub-step 852, referring also to FIG. 6, the rail operational analytics application organizes the preprocessed railroad track data and creates a network input 610. As in training, the network input may be a tensor organized according to three axes: a time axis, a spatial distance axis and a feature axis. At sub-step 854, the spatial feature encoder network 620 of the deep neural network 600 extracts latent spatial features 630 from the network input 610. At sub-step 856, the recurrent module 640 of the deep neural network 600 extracts time relationships of the extracted latent spatial features 630 to produce latent time-invariant features 650. At sub-step 858, the time-invariant decoder 660 of the deep neural network 600 produces predictions for a future time step of the probability of railroad track geometry exceedances 670 for each portion of track based on the latent time-invariant features 650.

Figure 9:
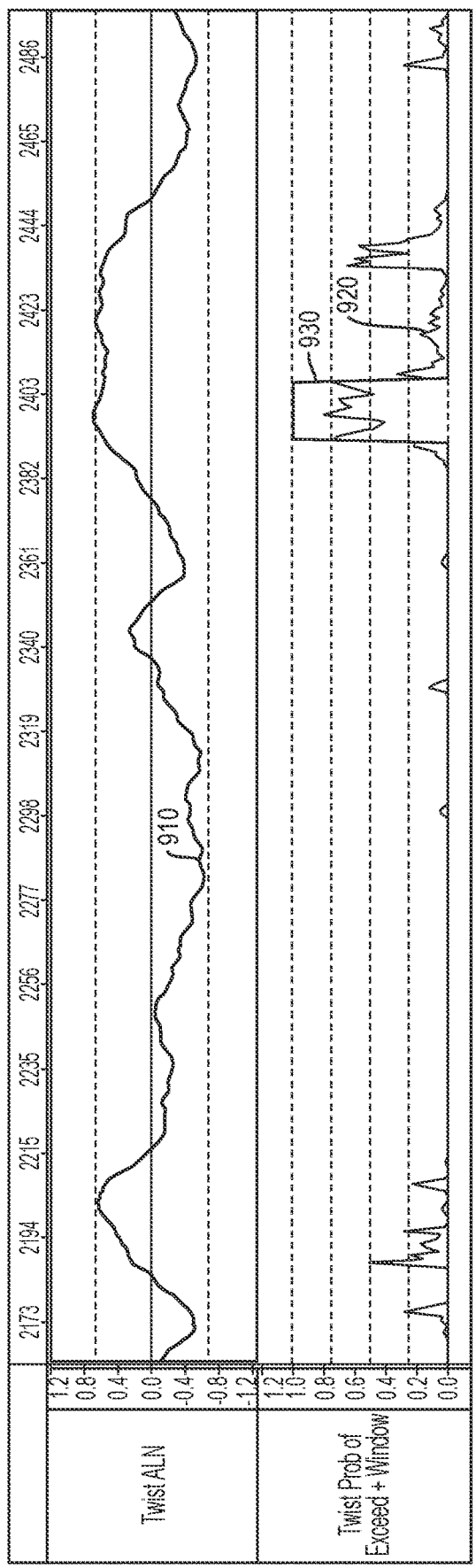
FIG. 9 is a diagram that illustrates an example of predicting probability of future railroad track geometry exceedances and converting the predictions of the probability to binary predictions.

At step 860, the rail operational analytics application converts the predictions of the probability of future railroad track geometry exceedances 670 to binary predictions of exceedances 680 (i.e., whether or not an exceedance is likely to occur) by comparing the probability of railroad track geometry exceedances to a probability threshold and applying hysteresis. FIG. 9 is a diagram 900 that illustrates an example of predicting probability of future railroad track geometry exceedances and converting the predictions of the probability to binary predictions. In the upper graph, a line 910 represents geometry measurements from a railroad track geometry survey of the preprocessed railroad track data. In the lower graph, a line 920 represents predicted probability of future railroad track geometry exceedances and a line 930 represents binary predictions of exceedances after application of a probability threshold and hysteresis.

Figure 10:
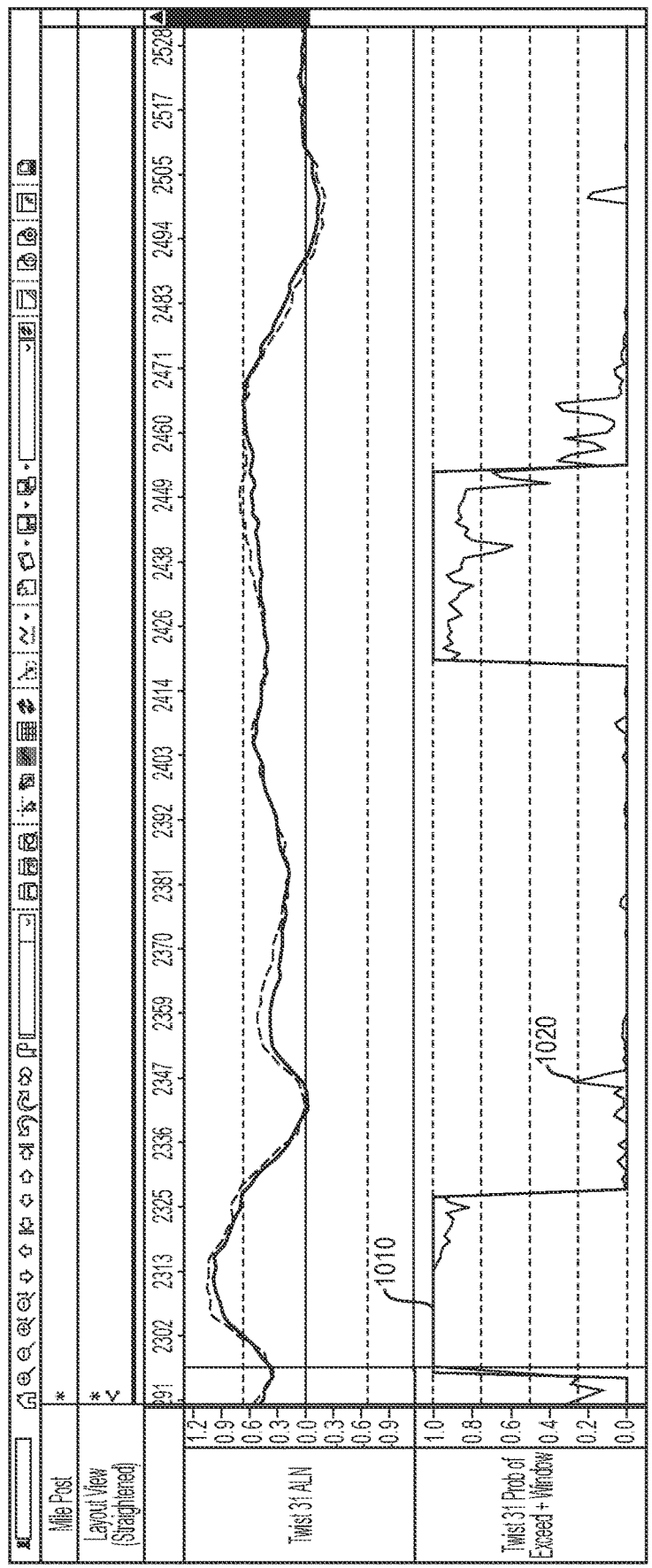
FIG. 10 is a screenshot of an example UI that includes both binary predictions of exceedances and underlying probability of railroad track geometry exceedances.

Finally, at step 870, at least the binary predictions of exceedances 680 are presented in a user interface (UI) of the rail operational analytics application to a user. In some implementations, details of the underlying probability of future railroad track geometry exceedances may also be shown. FIG. 10 is a screenshot of an example UI 1000 that includes both binary predictions of exceedances 1010 and underlying probability of future railroad track geometry exceedances 1020. It should be understood that a variety of other UIs may be provided that represent probability of future railroad track geometry exceedances using any of a variety of types of indicators.

As discussed above, the training mode and prediction mode of the rail operational analytics application 100 may utilize an outlier detection and removal algorithm that detects and attempts to fix outliers in railroad track geometry surveys. In this context, outliers are geometry measurements or strings of geometry measurements that are sampled from a distribution different than that of the rest of the geometry measurements. Outliers may come from noise in measurements, objects occluding a measurement, or other factors.

Outliers should be corrected if possible, or marked invalid (e.g., using a valid/invalid binary mask) as they do not accurately explain how railroad track changes through time.

Figure 11:
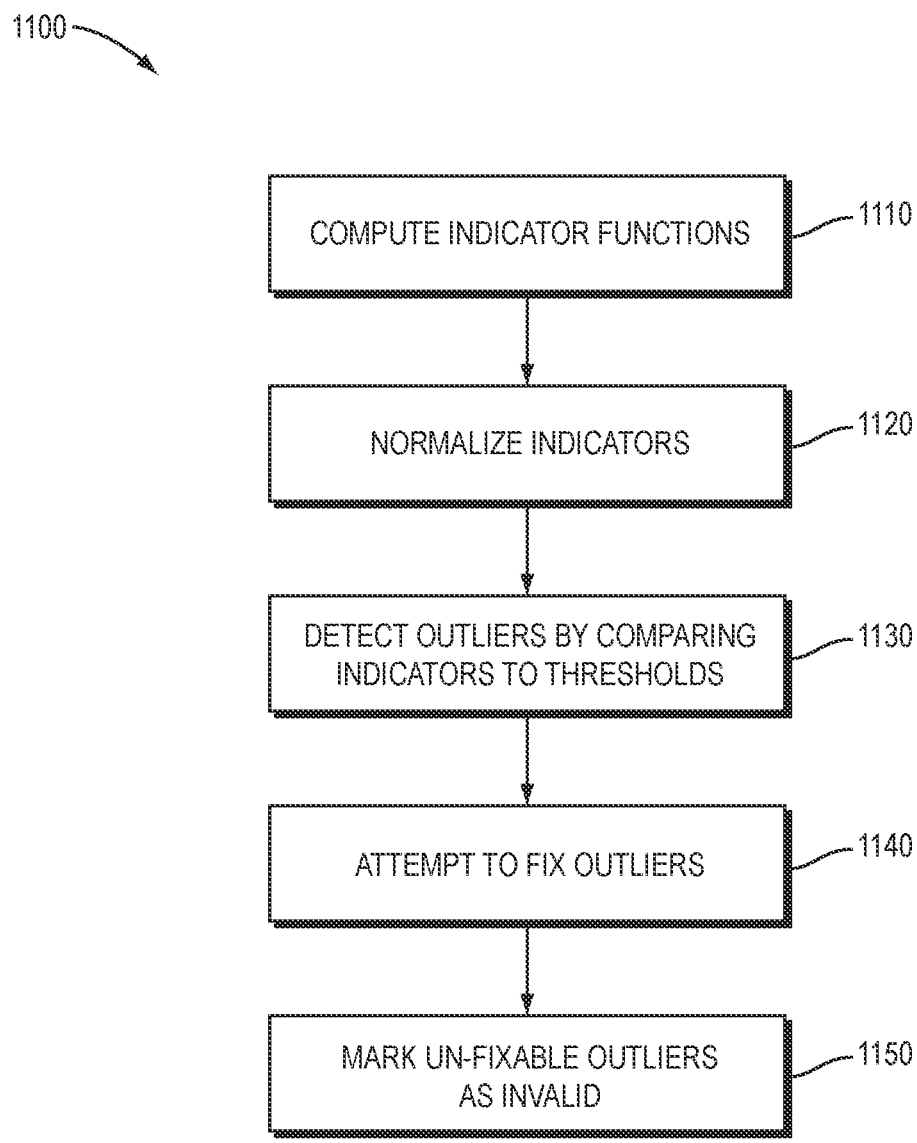
FIG. 11 is a flow diagram of an example sequence of steps that may be employed by an example outlier detection and removal algorithm.

FIG. 11 is a flow diagram of an example sequence of steps 1100 that may be employed by an example outlier detection and removal algorithm. At step 1110, for each railroad track geometry survey, for each of a plurality of selections of one or more geometry measurements, the outlier detection and removal algorithm computes an indicator function. The indicator function may be built from a combination of reconstruction error and weights obtained using an adaptive predictive filter on the geometry measurements and structured to increase in value when reconstruction error and filter weights increase in value. At step 1120, the outlier detection and removal algorithm normalizes all the indicators to bring them onto a common scale. At step 1130, the outlier detection and removal algorithm detects outliers by comparing the indicators or combinations of the indicators to one or more thresholds. Hysteresis may be applied to reduce identification of outliers. Further, nearby outliers may be merged if they are within a given distance along the track from each other. At step 1140, the outlier detection and removal algorithm attempts to fix each outlier in the training railroad track geometry surveys. Outliers may be fixed by adjusting one or more geometry measurements by a correction factor. At step 1150, the outlier detection and removal algorithm, for any outliers that cannot be fixed, marks the portion as invalid (e.g., using the valid/invalid binary mask).

Also as discussed above, the training mode and prediction mode of the rail operational analytics application 100 may utilize an alignment evaluation and correction algorithm that detects and attempts to realign portions of the railroad track geometry surveys of the railroad track data that are misaligned. In order to correctly predict exceedances, portions of the railroad track geometry surveys in space that are compared through time should register with each other. Misalignments causes by a measurement device's wheel slipping, calibration error in position measurement, or other factors, may prevent registration. To address large scale misalignments, any of a number of existing techniques may be used. To address fine scale misalignments, the alignment evaluation and correction algorithm may employ a special offset estimation and correction technique.

Figure 12:
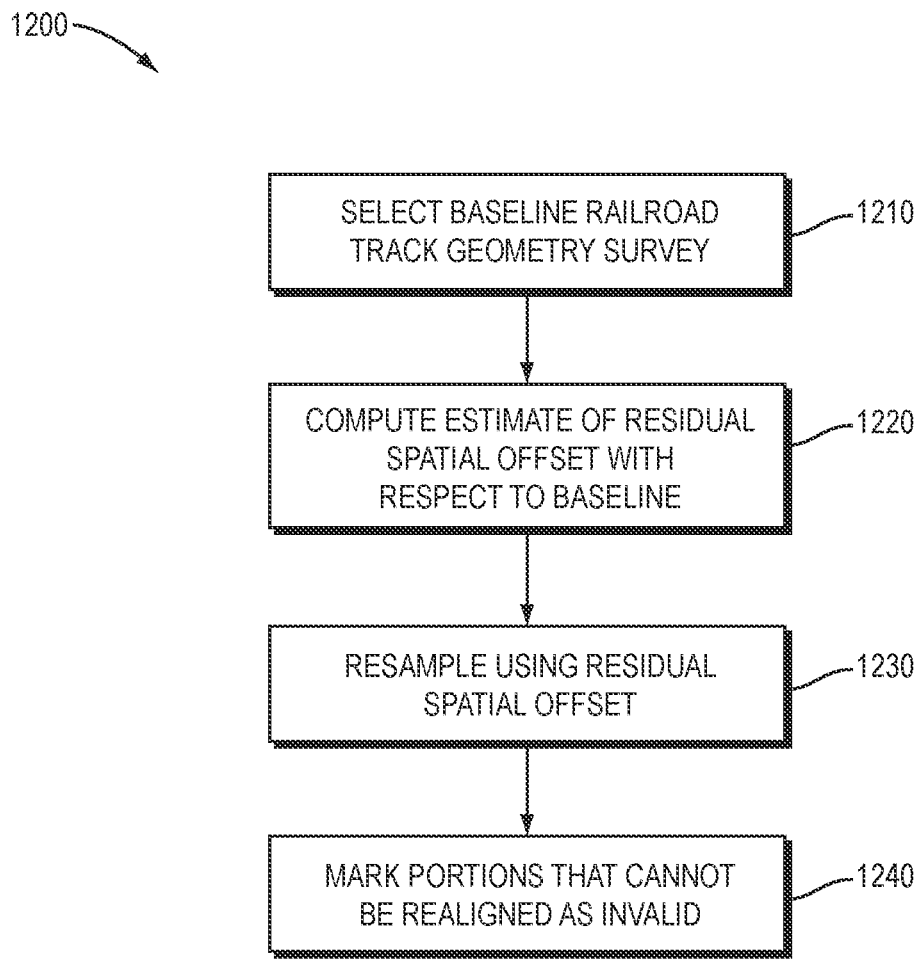
FIG. 12 is a flow diagram of an example sequence of steps that may be employed by an example alignment evaluation and correction algorithm for fine scale misalignments.

FIG. 12 is a flow diagram of an example sequence of steps 1200 that may be employed by an example alignment evaluation and correction algorithm for fine scale misalignments. At step 1210, the alignment evaluation and correction algorithm selects a baseline railroad track geometry survey from the railroad track data. At step 1220, for each other railroad track geometry survey of the railroad track data, the alignment evaluation and correction algorithm computes an estimate of residual spatial offset with respect to the baseline railroad track geometry survey. To estimate residual spatial offset, a sliding window technique may be employed, and a Fourier transform used. Each estimate may be weighted inside the window, with the largest weight given to the window center. Estimates may be averaged across overlapping windows, yielding a weighted average and an uncertainty. High uncertainty may indicate special cases, such as a maintenance in the baseline railroad track geometry survey, a maintenance in one of the other railroad track geometry surveys, a residual offset larger than the window, variations in residual offsets from one sliding window to the next, or invalid values, such as outliers. At step 1230, the alignment evaluation and correction algorithm resamples each of the railroad track geometry surveys of the railroad track data using the estimated residual spatial offset to attempt to realign the railroad track. In one implementation, a cubic spline interpolation method is used. Portions with high uncertainty may be specially handed. For example, for residual offsets greater than the window or variations in residual offsets, multiscale estimates may be produced by varying the window for portions with high uncertainty. Likewise, for maintenances in the baseline railroad track geometry survey or other railroad track geometry surveys, correction offsets to realign the railroad track may be computed for portions before or after the maintenances. Similarly, estimated residual spatial offset may be discarded for portions with invalid values, such as outliers. At step 1240, the alignment evaluation and correction algorithm marks any portions of railroad track geometry surveys that cannot be realigned as invalid. Hysteresis may be applied, and invalid portions merged if they are within a given distance along the track from each other.

It should be understood that various adaptations and modifications may be readily made to what is described above, to suit various implementations and environments. While it is discussed above that many aspects of the techniques may be implemented by specific software processes executing on specific hardware, it should be understood that some or all of the techniques may also be implemented by different software on different hardware. In addition to general-purpose computing devices, the hardware may include specially configured logic circuits and/or other types of hardware components. Above all, it should be understood that the above descriptions are meant to be taken only by way of example.

What is claimed is:

1. A method for using machine learning to predict railroad track geometry exceedances to enable proactive maintenance of railroad track, comprising:
    obtaining railroad track data, the railroad track data including a plurality of railroad track geometry surveys that each include geometry measurements of the railroad track at a corresponding time;
    processing, by an application executing on one or more computing devices, the railroad track data to at least one of remove outliers or correct alignment errors in the geometry measurements of each railroad track geometry survey thereof;
    predicting, by a trained machine learning model of the application, a probability of railroad track geometry exceedances for a future time step for each portion of track based on the processed railroad track data, the trained machine learning model to create a network input, extract latent spatial features from the network input, extract time relationships from the latent spatial features to produce latent time-invariant features, and decode the latent time-invariant features to produce predictions that include the probability of railroad track geometry exceedances for the future time step; and
    displaying, in a user interface of the application, an indication of the probability of railroad track geometry exceedances.

2. The method of claim 1, wherein the trained machine learning model is a deep neural network that includes a spatial feature encoder network based on one or more convolution layers, a recurrent module based on one or more gated recurrent units (GRUs) and a time-invariant decoder.

3. The method of claim 1, further comprising:
    converting the probability of railroad track geometry exceedances for at least some portions of track to a binary representation of exceedances by comparing the probability of railroad track geometry exceedances to a probability threshold, wherein the displayed indication includes the binary representation of exceedances.

4. The method of claim 1, further comprising:

training a machine learning model using training railroad track data, the training railroad track data including a plurality of training railroad track geometry surveys that each includes geometry measurements of the railroad track at a corresponding time.

5. The method of claim 4, wherein the training comprises:

obtaining the training railroad track data that includes the plurality of training railroad track geometry surveys;

extracting training sequences of geometry measurements from the training railroad track data to produce a training dataset; and iteratively refining the machine learning model using the training dataset.

6. The method of claim 5, wherein the training further comprises:

dividing the training dataset into a first subset and a second subset; and determining actual railroad track geometry exceedances in portions of track based on the geometry measurements of the second subset, wherein the iteratively refining includes applying the geometry measurements of the first subset to predict the probability of railroad track geometry exceedances for each portion of track and comparing predicted probability of railroad track geometry exceedances for each portion of track against the actual railroad track geometry exceedances for each portion of track determined based on the geometry measurements of the second subset.

7. The method of claim 6, wherein the second subset includes geometry measurements of a most recent railroad track geometry survey, and actual railroad track geometry exceedances for each portion of track are determined by applying safety and/or maintenance thresholds to the geometry measurements of the most recent railroad track geometry survey.

8. The method of claim 5, wherein the iteratively refining further comprises:

calculating a loss function based on the comparison.

9. The method of claim 5, wherein the railroad track data further includes one or more maintenance logs that each include information about one or more maintenances performed on the railroad track, and the extracting training sequences selects geometry measurements for a portion of track that is not marked as invalid and does not correspond to a maintenance.

10. The method of claim 1, wherein the processing removes outliers by operations that comprise:

for each railroad track geometry survey of the railroad track data, and for each of a plurality of selections of one or more geometry measurement of the respective railroad track geometry survey, computing an indicator;

normalizing the indicators to a common scale;

comparing the indicators or combinations of the indicators to one or more thresholds; and correcting or marking the portions of each railroad track geometry survey that are outliers as invalid.

11. The method of claim 1, wherein the processing corrects alignment errors by operations that comprise:

selecting a baseline railroad track geometry survey from the railroad track data;

for each other railroad track geometry survey of the railroad track data, computing an estimate of residual spatial offset with respect to the baseline railroad track geometry survey;

resampling each of the railroad track geometry surveys of the railroad track data using the estimated residual spatial offset to attempt to realign the railroad track data; and marking any portions of railroad track geometry surveys of the railroad track data that cannot be realigned as invalid.

12. A computing device comprising:

a display screen;

a processor; and a memory coupled to the processor and configured to store railroad track data that includes a plurality of railroad track geometry surveys that each include geometry measurements of the railroad track at a corresponding time, a trained machine learning model and a rail operational analytics application, the rail operational analytics application when executed operable to:

process the railroad track data to at least one of remove outliers or correct alignment errors;

directly predict, using the trained machine learning model, a probability of railroad track geometry exceedances for a future time step for each portion of track based on the processed railroad track data; and display, in a user interface on the display screen, an indication of the probability of railroad track geometry exceedances for the future time step.

13. The computing device of claim 12, wherein the machine learning model is a deep neural network that includes a spatial feature encoder network based on one or more convolution layers, a recurrent module based on one or more gated recurrent units (GRUs) and a time-invariant decoder and the application is operable to predict the probability of railroad track geometry exceedances for each portion of track by extracting, using the spatial feature encoder network, latent spatial features, learning, using the recurrent module, relationships of the extracted latent spatial features over time to produce latent time-invariant features, and producing, using the time-invariant decoder, predictions for the future time step of the probability of railroad track geometry exceedances for each portion of track based on the latent time-invariant features.

14. A non-transitory computing device readable medium having instructions stored thereon, the instructions when executed by one or more computing devices operable to:

obtain railroad track data, the railroad track data including a plurality of railroad track geometry surveys that each include geometry measurements of the railroad track at a corresponding time;

predict, using a trained machine learning model, a probability of railroad track geometry exceedances for a future time step for each portion of track based on the processed railroad track data, the trained machine learning model to create a network input, extract latent spatial features from the network input, extract time relationships from the latent spatial features to produce latent time-invariant features, and decode the latent time-invariant features to produce predictions that include the probability of railroad track geometry exceedances for the future time step; and display an indication of the probability of railroad track geometry exceedances.

15. The non-transitory electronic-device readable medium of claim 14,
wherein the instructions when executed are further operable to: convert the probability of railroad track geometry exceedances for at least some portions of track to a binary representation of exceedances by comparing the probability of railroad track geometry exceedances to a probability threshold,
wherein the displayed indication includes the binary representation of exceedances.

16. The non-transitory electronic-device readable medium of claim 14, wherein the instructions when executed are further operable to:
train a machine learning model using training railroad track data, the training railroad track data including a plurality of training railroad track geometry surveys that each includes geometry measurements of the railroad track at a corresponding time.

17. The non-transitory electronic-device readable medium of claim 16, wherein the instructions when executed are further operable to:
obtain the training railroad track data that includes the plurality of training railroad track geometry surveys;
extract training sequences of geometry measurements from the training railroad track data to produce a training dataset; and
iteratively refine the machine learning model using the training dataset.

18. The non-transitory electronic-device readable medium of claim 17, wherein the instructions when executed are further operable to:
divide the training dataset into a first subset and a second subset; and
determine actual railroad track geometry exceedances in portions of track based on the geometry measurements of the second subset,
wherein the instruction to iteratively refine include instructions operable to apply the geometry measurements of the first subset to predict the probability of railroad track geometry exceedances for each portion of track and compare predicted probability of railroad track geometry exceedances for each portion of track against the actual railroad track geometry exceedances for each portion of track determined based on the geometry measurements of the second subset.

19. The non-transitory electronic-device readable medium of claim 18, wherein the second subset includes geometry measurements of a most recent railroad track geometry survey, and actual railroad track geometry exceedances for each portion of track are determined by applying safety and/or maintenance thresholds to the geometry measurements of the most recent railroad track geometry survey.

20. The non-transitory electronic-device readable medium of claim 17, wherein the railroad track data further includes one or more maintenance logs that each include information about one or more maintenances performed on the railroad track, and the instructions operable to extract training sequences are further operable to select geometry measurements for a portion of track that is not marked as invalid and does not correspond to a maintenance.

21. A method for using machine learning to predict railroad track geometry exceedances, comprising:
obtaining railroad track data, the railroad track data including a plurality of railroad track geometry surveys that each include geometry measurements of the railroad track at a corresponding time;
processing, by an application executing on one or more computing devices, the railroad track data;
predicting, by a trained machine learning model of the application, a probability of railroad track geometry exceedances for a future time step for each portion of track based on the processed railroad track data;
converting, by the application, the probability of railroad track geometry exceedances to a binary representation of exceedances for the future time step by comparing the probability of railroad track geometry exceedances to a probability threshold; and
displaying, by the application in a user interface on the display screen, an indication of the binary representation of exceedances for the future time step.

22. The method of claim 21, further comprising:
training a machine learning model using a training dataset that includes a plurality geometry measurements of the railroad track at corresponding times to produce the trained machine learning model, wherein the training includes:
dividing the training dataset into a first subset and a second subset,
determining actual railroad track geometry exceedances in portions of track based on geometry measurements of the second subset,
applying geometry measurements of the first subset to machine learning model to predict the probability of railroad track geometry exceedances for each portion of track, and
comparing predicted probability of railroad track geometry exceedances for each portion of track against the actual railroad track geometry exceedances for each portion of track determined based on the geometry measurements of the second subset.

23. The method of claim 22, wherein the second subset includes geometry measurements of a most recent railroad track geometry survey, and actual railroad track geometry exceedances for each portion of track are determined by applying safety and/or maintenance thresholds to the geometry measurements of the most recent railroad track geometry survey.

* * * * *